United States Patent
Jeong et al.

(10) Patent No.: US 9,816,734 B2
(45) Date of Patent: Nov. 14, 2017

(54) AIR CONDITIONER AND METHOD FOR CONTROLLING AN AIR CONDITIONER

(71) Applicant: LG ELECTRONICS INC., Seoul (KR)

(72) Inventors: Hojong Jeong, Seoul (KR); Kwangho Shin, Seoul (KR); Minho Chung, Seoul (KR); Song Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 120 days.

(21) Appl. No.: 14/993,796

(22) Filed: Jan. 12, 2016

(65) Prior Publication Data
US 2016/0201955 A1     Jul. 14, 2016

(30) Foreign Application Priority Data
Jan. 12, 2015    (KR) ........................ 10-2015-0004174

(51) Int. Cl.
     *F25B 1/00*         (2006.01)
     *F25B 13/00*       (2006.01)
     *F25B 49/02*       (2006.01)

(52) U.S. Cl.
     CPC ............ *F25B 13/00* (2013.01); *F25B 49/022* (2013.01); *F25B 2313/004* (2013.01);
(Continued)

(58) Field of Classification Search
     CPC ........ F25B 2600/2501; F25B 2313/005; F25B 2313/0253; F25B 2313/004
See application file for complete search history.

(56) References Cited

U.S. PATENT DOCUMENTS

2008/0034777 A1    2/2008    Copeland et al.
2014/0360222 A1    12/2014    Masui

FOREIGN PATENT DOCUMENTS

EP          1 202 005       5/2002
EP          1 288 592       3/2003
(Continued)

OTHER PUBLICATIONS

Korean Office Action dated Dec. 4, 2015 issued in Application No. 10-2015-0004180.
(Continued)

*Primary Examiner* — Emmanuel Duke
(74) *Attorney, Agent, or Firm* — KED & Associates, LLP

(57) ABSTRACT

An air conditioner and a method for controlling an air conditioner are provided. The air conditioner may include at least one indoor device, an electric heat pump (EHP) outdoor device connected to the at least one indoor device and having an EHP compressor driven using an applied current, and a gas heat pump (GHP) outdoor device connected to the at least one indoor device having an engine driven using a combustion of gas and a GHP compressor driven by receiving a driving force from the engine. The EHP compressor may include an inverter that controls a frequency of the current applied to the EHP compressor. The GHP compressor may include a first compressor that receives a driving force from the engine to compress a refrigerant; and a second compressor that is connected to the first compressor in parallel and receives the driving force from the engine to compress the refrigerant.

21 Claims, 6 Drawing Sheets

(52) U.S. Cl.
CPC . *F25B 2313/005* (2013.01); *F25B 2313/0253* (2013.01); *F25B 2400/075* (2013.01); *F25B 2600/021* (2013.01); *F25B 2600/2501* (2013.01); *Y02B 30/741* (2013.01)

(56) References Cited

FOREIGN PATENT DOCUMENTS

| | | |
|---|---|---|
| EP | 1 628 094 | 2/2006 |
| EP | 1 882 890 | 1/2008 |
| EP | 1 882 891 | 1/2008 |
| JP | 07-332815 | 12/1995 |
| JP | 08-254371 | 10/1996 |
| JP | 11-315719 A | 11/1999 |
| JP | 2000-097515 | 4/2000 |
| JP | 2002430743 | 5/2002 |
| JP | 2002-168539 | 6/2002 |
| JP | 2003-021416 | 1/2003 |
| JP | 2003021416 A * | 1/2003 |
| JP | 2003-194384 | 7/2003 |
| JP | 2006-194467 | 7/2006 |
| JP | 2007-225141 | 9/2007 |
| JP | 2008-309383 | 12/2008 |
| JP | 2009-079813 | 4/2009 |
| JP | 2011-75162 | 4/2011 |
| JP | 2011075162 A * | 4/2011 |
| JP | 2012 007868 | 1/2012 |
| JP | 2014-092344 | 5/2014 |
| KR | 10-0199325 | 6/1999 |
| KR | 10-2004-0085540 | 10/2004 |
| KR | 10-2003-0077857 A | 5/2005 |
| KR | 10-2005-0043089 A | 5/2005 |
| KR | 10-2005-0112151 | 5/2006 |
| KR | 10-0575682 | 5/2006 |
| KR | 10-2007-0014952 | 2/2007 |
| KR | 10-0765563 | 10/2007 |
| KR | 10-2010-0002770 | 1/2010 |
| KR | 10-2010-0069188 | 6/2010 |
| KR | 10-2010-0129138 | 12/2010 |
| KR | 10-2014-0052339 A | 5/2014 |
| WO | WO 2014/065548 | 5/2014 |

OTHER PUBLICATIONS

Korean Office Action dated Jan. 4, 2016 issued in Application No. 10-2015-0004227.
European Search Report dated May 13, 2016 issued in Application No. 16150788.4.
Korean Notice of Allowance dated May 25, 2016 issued in Application No. 10-2015-0004227.
European Search Report dated May 25, 2016 issued in Application No. 15202910.4.
European Search Report dated Jun. 23, 2016 issued in Application No. 16150602.7.
Korean Office Action dated Jun. 28, 2016 issued in Application No. 10-2015-004178.
European Search Report dated May 31, 2016 issued in Application No. 16150596.1.
European Search Report dated May 31, 2016 issued in Application No. 16150600.1.
Korean Office Action dated Jul. 25, 2016 issued in Application No. 10-2015-0004275.
European Search Report dated Jun. 23, 2016 issued in Application No. 16150587.0.
Korean Notice of Allowance dated Jul. 26, 2016 issued in Application No. 10-2015-0004223.
Korean Office Action dated Aug. 12, 2016 issued in Application No. 10-2015-0004180.
Korean Office Action dated Nov. 27, 2015 issued in Application No. 10-2015-0004174.
Korean Notice of Allowance dated Dec. 26, 2016 issued in Application No. 10-2015-0004175.
Korean Notice of Allowance dated Dec. 26, 2016 issued in Application No. 10-2015-0004178.
Korean Notice of Allowance dated Jan. 10, 2017 issued in Application No. 10-2015-0004275.
U.S. Office Action dated Jul. 6, 2017 issued in co-pending U.S. Appl. No. 14/992,460.
U.S. Office Action dated Jul. 12, 2017 issued in co-pending U.S. Appl. No. 14/992,556.
U.S. Appl. No. 14/990,570, filed Jan. 7, 2016.
U.S. Appl. No. 14/991,135, filed Jan. 8, 2016.
U.S. Appl. No. 14/991,247, filed Jan. 8, 2016.
U.S. Appl. No. 14/992,460, filed Jan. 11, 2016.
U.S. Appl. No. 14/992,556, filed Jan. 11, 2016.
U.S. Appl. No. 14/993,693, filed Jan. 12, 2016.

\* cited by examiner

AIR CONDITIONER AND METHOD FOR CONTROLLING AN AIR CONDITIONER

CROSS-REFERENCE TO RELATED APPLICATION

This application claims priority under 35 U.S.C. §119 to Korean Patent Application No. 10-2015-0004174, filed in Korea on Jan. 12, 2015, whose entire disclosure is hereby incorporated by reference.

BACKGROUND

1. Field

An air conditioner and a method for controlling an air conditioner are disclosed herein.

2. Background

An air conditioner is an apparatus that cools, warms, or purifies indoor air to provide a comfortable indoor environment for a user. The air conditioner may be classified according to a power source for driving a compressor as an electric heat pump (EHP) type, which uses electric power, or a gas heat pump (GHP) type, which uses a gas fuel, such as liquid petroleum gas (LPG) or liquefied natural gas (LNG). In the GHP type, an engine is operated by burning the gas fuel to drive the compressor.

The EHP type air conditioner has an advantage in that the compressor is easily controlled by controlling current, and thus, is able to easily respond to a partial load.

In the GHP type air conditioner, as the engine is driven using the gas fuel, such as LPG or LNG, it is not influenced by supply and demand of the electric power.

Korean Patent Publication No. 10-2005-0043089, which is hereby incorporated by reference, discloses a heat pump for an air conditioner.

BRIEF DESCRIPTION OF THE DRAWINGS

Embodiments will be described in detail with reference to the following drawings in which like reference numerals refer to like elements, and wherein.

DETAILED DESCRIPTION

Figure 1:
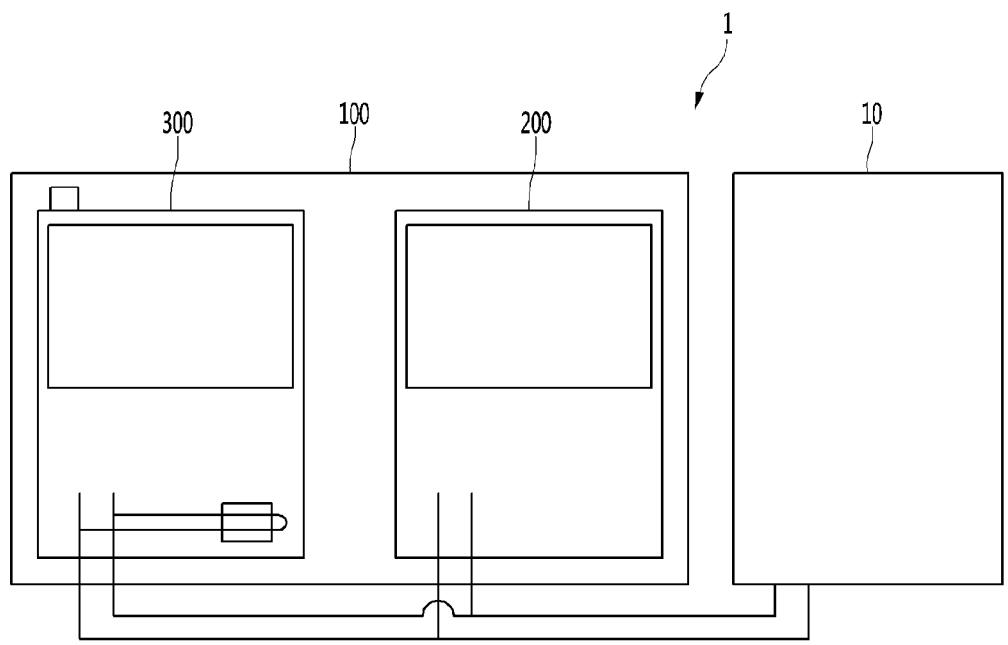
FIG. 1 is a schematic diagram of an air conditioner according to an embodiment.
Figure 2:
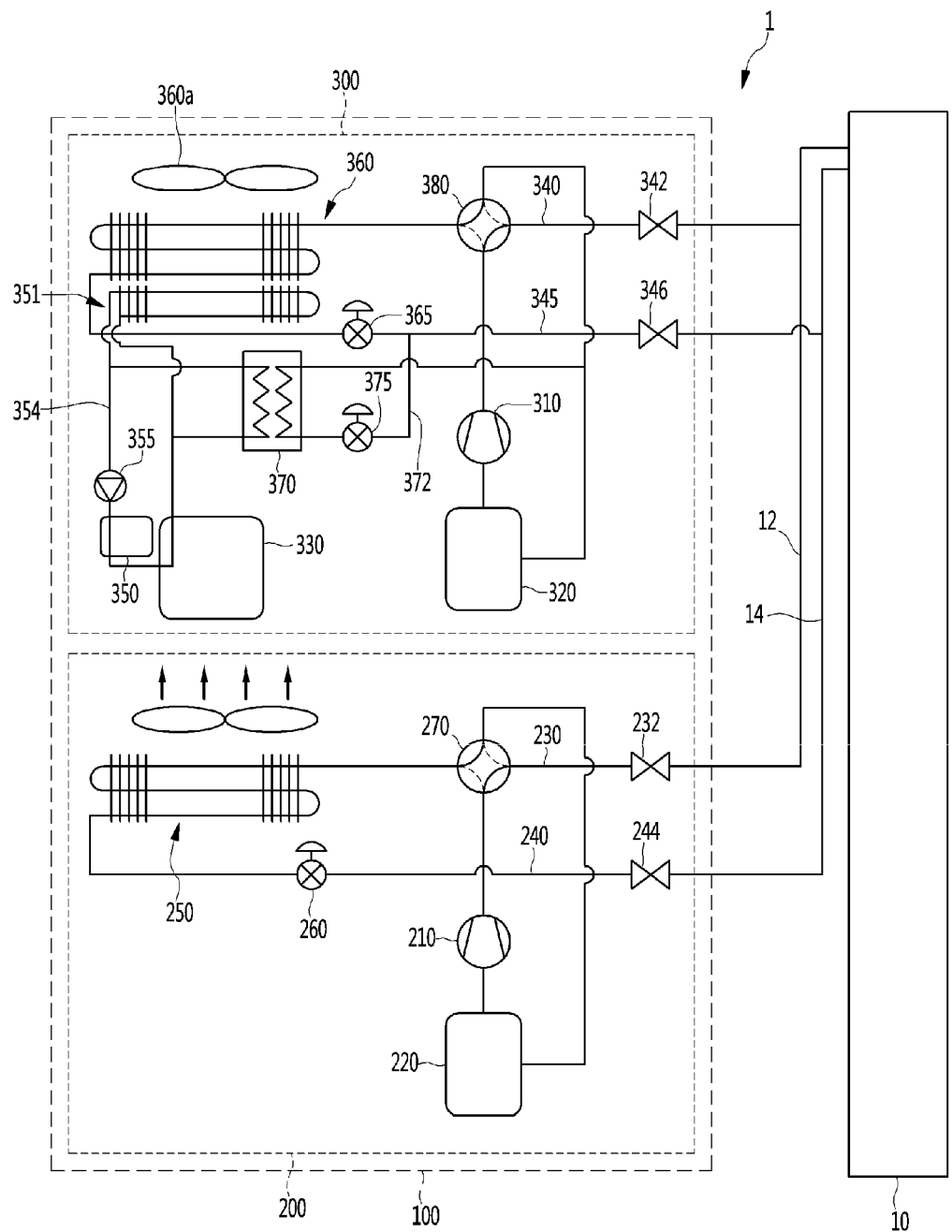
FIG. 2 is a detailed schematic diagram of the air conditioner of FIG. 1.
Figure 3:
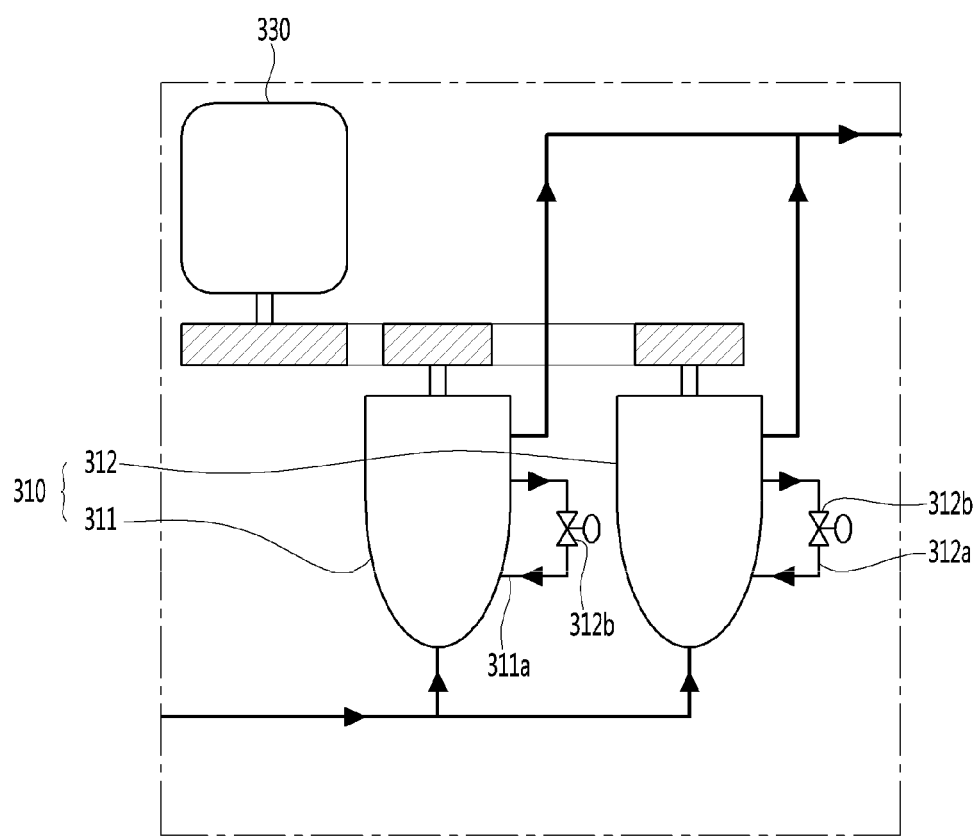
FIG. 3 is a schematic diagram illustrating an engine of a GHP outdoor device connected to a GHP compressor in the air conditioner of FIG. 2.

FIG. 1 is a schematic diagram of an air conditioner according to an embodiment. FIG. 2 is a detailed schematic diagram of the air conditioner of FIG. 1. FIG. 3 is a schematic diagram illustrating an engine of a GHP outdoor unit or device connected to a GHP compressor in the air conditioner of FIG. 2. Referring to FIGS. 1 to 3, an air conditioner 1 may include an indoor unit or device 10 and an outdoor unit or device 100. One or more indoor device 10 may be provided. The one or more indoor device 10 may be connected to the outdoor device 100 and may cool, warm, or purify indoor air.

The indoor device 10 may include a pair of pipes 12 and 14 for connection to the outdoor device 100. The pair of pipes 12 and 14 may include a gas pipe 12 that connects an EHP gas pipe 230 and a GHP gas pipe 340, which will be described hereinafter, and a liquid pipe 14 that connects an EHP liquid pipe 240 and a GHP liquid pipe 345, which will be described hereinafter.

The outdoor device 100 may be connected to the indoor device 10 and may perform compressing and expanding, for example, of a refrigerant so as to sufficiently exchange heat. A plurality of outdoor devices 100 may be provided. Hereinafter, for convenience of explanation, an embodiment having one pair of outdoor devices 100 will be described.

The pair of outdoor devices 100 may include an electric heat pump (EHP) outdoor device or device 200 as an EHP using electric power, and a gas heat pump (GHP) outdoor device or device 300 as a GHP using a gas fuel, such as LPG or LNG. The EHP outdoor device 200 may be an outdoor device operated using an EHP method and may include an EHP compressor 210, a first accumulator 220, the EHP gas pipe 230, the EHP liquid pipe 240, a pair of connection valves 232 and 244, a first outdoor heat exchanger 250, a first outdoor heat exchanger control valve 260, and a first four-way valve 270.

The EHP compressor 210 may compress a refrigerant and may be driven by applying a current. When the current is applied to the EHP compressor 210, the EHP compressor 210 may compress the refrigerant. As the EHP compressor 210 is driven by controlling the current, it may have less effect on outdoor air and may be well suited for responding to a partial load.

The EHP compressor 210 may include an inverter compressor having an inverter that controls a frequency of the current applied to the EHP compressor 210. The inverter compressor may control a driving frequency according to an increase or decrease in a driving load, and thus, may respond to the driving load. The EHP compressor 210 may include two inverter compressors (not shown) arranged or provided in parallel with each other.

The first accumulator 220 may be installed or provided at a suction intake side of the EHP compressor 210 to supply the refrigerant to the EHP compressor 210. Because the EHP compressor 210 may be damaged if the refrigerant backflows into the EHP compressor 210 or a liquid refrigerant is sucked into the EHP compressor 210, the first accumulator 220 may temporarily store a mixture of oil and refrigerant.

The EHP gas pipe 230 may be installed or provided at a discharge outlet side of the EHP compressor 210 and may connect the EHP compressor 210 to the indoor device 10. The EHP gas pipe 230 may connect the EHP compressor 210 to the gas pipe 12. The EHP liquid pipe 240 may connect a side portion of the first outdoor heat exchanger 250 to the indoor device 10. The EHP liquid pipe 240 may connect the first outdoor heat exchanger 250 to the liquid pipe 14. The pair of connection valves 232 and 244 may include a first connection valve 232 that connects the EHP gas pipe 230 to the gas pipe 12 and a second connection valve 244 that connects the EHP liquid pipe 240 to the liquid pipe 14.

In the first outdoor heat exchanger 250, the refrigerant may be evaporated or condensed depending on a warming operation or a cooling operation of the air conditioner 1. When the air conditioner 1 performs the cooling operation, the refrigerant may be condensed, and when air conditioner 1 performs the warming operation, the refrigerant may be evaporated. An outdoor fan may be installed or provided at a side of the first outdoor heat exchanger 250.

The first outdoor heat exchanger control valve 260 may control a flow of the refrigerant to the first outdoor heat exchanger 250. For example, the first outdoor heat exchanger control valve 260 may include an electronic expansion valve (EEV). Opening of the first outdoor heat exchanger control valve 260 may be controlled according to whether the air conditioner 1 performs the warming operation or the cooling operation.

For example, when the air conditioner 1 performs the cooling operation, the refrigerant condensed in the first outdoor heat exchanger 250 may pass through the first outdoor heat exchanger control valve 260 and may flow to the indoor device 10, and an extent or degree of opening of the first outdoor heat exchanger control valve 260 may be controlled so that the refrigerant may not be decompressed. When the air conditioner 1 performs a warming operation, the refrigerant condensed in the indoor device 10 may pass through the first outdoor heat exchanger control valve 260 and may flow toward the first outdoor heat exchanger 250, and the extent or degree of opening of the first outdoor heat exchanger control valve 260 may be controlled so that the refrigerant may be decompressed.

The first four-way valve 270 may switch a path of the refrigerant flowing in the EHP outdoor device 200. When the air conditioner 1 performs the cooling operation, the first four-way valve 270 may guide the refrigerant compressed in the EHP compressor 210 to the first outdoor heat exchanger 250. However, when the air conditioner 1 performs the warming operation, the first four-way valve 270 may guide the refrigerant compressed in the EHP compressor 210 to the indoor device 10. The EHP gas pipe 230 may be a pipe on a discharge outlet side of the EHP compressor 210 and may extend to the first connection valve 232 via the first four-way valve 270.

The GHP outdoor device 300 may be an outdoor device operated using a GHP method and may include a GHP compressor 310, a second accumulator 320, an engine 330, the GHP gas pipe 340, the GHP liquid pipe 345, a pair of connection valves 342 and 346, a cooling water heat exchanger 350, a cooling water pump 355, a second outdoor heat exchanger 360, a second outdoor heat exchanger control valve 365, a plate type heat exchanger 370, a plate type heat exchanger control valve 375, and a second four-way valve 380. The GHP gas pipe 340 and the GHP liquid pipe 345 may be parts or portions of a refrigerant pipe provided at the GHP outdoor device 300. The GHP gas pipe 340 may connect a discharge outlet side of the GHP compressor 310 to the indoor device 10, and the GHP liquid pipe 345 may connect the second outdoor heat exchanger 360 to the indoor device 10.

The GHP compressor 310 may compress the refrigerant and may be operated by driving the engine 330, which will be described hereinafter. When a driving force is delivered to the GHP compressor 310 by the engine 330, the GHP compressor 310 may compress the refrigerant.

The GHP compressor 310 may include a first compressor 311 and a second compressor 312. The first compressor 311 and the second compressor 312 may be connected in parallel with each other and receive the driving force from the engine 330. The first compressor 311 and the second compressor 312 may receive the driving force from the engine 330 and may be simultaneously or separately operated.

The GHP outdoor device 300 may further include bypass pipes 311a and 312a installed or provided at a side of the first compressor 311 and the second compressor 312, respectively, so that a high pressure side of each compressor 311, 312 may be in communication with a low pressure side thereof. The bypass pipes 311a and 312a may include a first bypass pipe 311a and a second bypass pipe 312a. The GHP outdoor device 300 may further include capacity valves 311b and 312b installed or provided at the first bypass pipe 311a and the second bypass pipe 312a, respectively, and may control a flow of the refrigerant.

For example, the first compressor 311 may have the first bypass pipe 311a. The first bypass pipe 311a may connect a high pressure side of the first compressor 311 to a low pressure side thereof, so that the refrigerant of the high pressure side of the first compressor 311 may flow to the low pressure side of the first compressor 311.

The first bypass pipe 311a may have a first capacity valve 311b. The first capacity valve 311b may selectively close a path of the first bypass pipe 311a. For example, the first capacity valve 311b may include an electronic expansion valve (EEV), which may control an extent or degree of opening, or a solenoid valve, which may open and close.

When the first capacity valve 311b is opened, the refrigerant at the high pressure side of the first compressor 311 may flow to the low pressure side of the first compressor 311 via the first bypass pipe 311a. The first compressor 311 may be driven with a partial load that corresponds to 50% of a full load. That is, when the first capacity valve 311b is opened, some of the refrigerant at the high pressure side of the first compressor 311 may flow to the low pressure side of the first compressor 311 through the first bypass pipe 311a so that the first compressor 311 may operate with the partial load. When the first capacity valve 311b is closed, the first compressor 311 may be driven up to the full load.

The second compressor 312 may have the second bypass pipe 312a. The second bypass pipe 312a may connect a high pressure side of the second compressor 312 to a low pressure side thereof so that the refrigerant at the high pressure side of the second compressor 312 may flow to the low pressure side of the second compressor 312.

The second bypass pipe 312a may have a second capacity valve 312b. The second capacity valve 312b may selectively close a path of the second bypass pipe 312a. For example, the second capacity valve 312b may include an electronic expansion valve (EEV), which may control an extent or degree of opening, or a solenoid valve, which may open and close.

When the second capacity valve 312b is opened, the refrigerant at the high pressure side of the second compressor 312 may flow to the low pressure side of the second compressor 312 via the second bypass pipe 312a. The second compressor 312 may be driven with a partial load that corresponds to 50% of a full load. That is, when the second capacity valve 312b is opened, some of the refrigerant at the high pressure side of the second compressor 312 may flow to the low pressure side of the second compressor 312 through the second bypass pipe 312a so that the second compressor 312 may be operated with the partial load. When the second capacity valve 312b is closed, the second compressor 312 may be driven up to the full load.

The second accumulator 320 may supply the refrigerant to the GHP compressor 310. Because the GHP compressor 310 may be damaged if the refrigerant backflows into the GHP compressor 310 or the liquid refrigerant is sucked into the GHP compressor 310, the second accumulator 320 may temporarily store a mixture of the oil and refrigerant.

The engine 330 may generate a driving force by burning the gas fuel, such as LPG or LNG. The engine 330 may be connected to the GHP compressor 310 and deliver the driving force to the GHP compressor 310. By combusting gas in the engine 330, the GHP outdoor device 300 may be operated as a gas heat pump.

The GHP outdoor device 300 may include an air supply and a fuel supply, which supply a fuel mixture to the engine 330, and a mixer that mixes the air with the fuel. The air supply may include an air filter that purifies the air. The fuel supply may include a governor that supplies the fuel at a predetermined pressure.

For example, the governor may include a zero-governor that constantly supplies the fuel to the engine 330. The zero-governor may be a device that constantly controls an outlet pressure of the fuel, regardless of an inlet pressure or a flow rate of the fuel, and then supplies the fuel. For example, the zero-governor may include a nozzle, which may decrease a pressure of the fuel, a diaphragm, on which the pressure decreased at the nozzle may act, and a valve, which may be opened or closed by an action of the diaphragm. The air passed through the air filter and the fuel discharged from the zero-governor may be mixed in the mixer, and mixed air and fuel may be supplied to the engine 330.

The GHP gas pipe 340 may connect to the indoor device 10. The GHP gas pipe 340 may connect the GHP compressor 310 to the gas pipe 12. That is, the GHP gas pipe 340 may extend from a discharge outlet side of the GHP compressor 310 to the gas pipe 12. The GHP liquid pipe 345 may connect to the indoor device 10. The GHP liquid pipe 345 may connect the second outdoor heat exchanger 360 to the liquid pipe 14. The pair of connection valves 342 and 346 may include a third connection valve 342, which may connect the GHP gas pipe 340 to the gas pipe 12, and a fourth connection valve 346, which may connect the GHP liquid pipe 345 to the liquid pipe 14.

The cooling water heat exchanger 350 may be provided at a side of the engine 330 to cool the engine 330. The cooling water heat exchanger 350 may absorb heat of the engine 330 overheated due to driving.

The GHP outdoor device 300 may further include a cooling water pipe 354 that guides a flow of cooling water for cooling the engine 330. The cooling water pipe 354 may be connected to the cooling water heat exchanger 350.

The cooling water pump 355, which may generate a flow force of the cooling water, and a radiator 351, which may cool the cooling water, may be installed at the cooling water pipe 354. The radiator 351 may be provided at a side of the second outdoor heat exchanger 360, and the cooling water flowing through the radiator 351 may exchange heat with outside air by an outdoor fan 360*a* to be cooled. The cooling water passed through the cooling water pump 355 may pass through the cooling water pipe 354 and then may be supplied to the cooling water heat exchanger 350.

The second outdoor heat exchanger 360 may evaporate or condense the refrigerant according to the warming operation or the cooling operation of the air conditioner 1. When the air conditioner 1 performs the cooling operation, the refrigerant may be condensed, and when air conditioner 1 performs the warming operation, the refrigerant may be evaporated. The outdoor fan 360*a* that blows the external air may be installed or provided at a side of the second outdoor heat exchanger 360.

The second outdoor heat exchanger control valve 365 may control a flow of the refrigerant to the second outdoor heat exchanger 360 and may be installed or provided at the GHP liquid pipe 345. As the second outdoor heat exchanger control valve 365 is similar to the first outdoor heat exchanger control valve 260, detailed description thereof has been omitted.

The plate type heat exchanger 370 may be a heat exchanger in which a low pressure refrigerant may exchange heat with high temperature cooling water. The cooling water may be cooled while exchanging heat in a plate type heat exchanger 370, and the refrigerant may be evaporated in this process.

The plate type heat exchanger control valve 375 may be installed or provided at or on a connection pipe 372 of the plate type heat exchanger 370 and may control a flow of the refrigerant to the plate type heat exchanger 370. The connection pipe 372 of the plate type heat exchanger 370 may branch from the GHP liquid pipe 345 and extend to the plate type heat exchanger 370. The plate type heat exchanger control valve 375 may be installed or provided parallel with the second outdoor heat exchanger control valve 365.

The second four-way valve 380 may switch a path of the refrigerant flowing in the GHP outdoor device 300. As the second four-way valve 380 is similar to the first four-way valve 270, detailed description thereof has been omitted.

Figure 4:
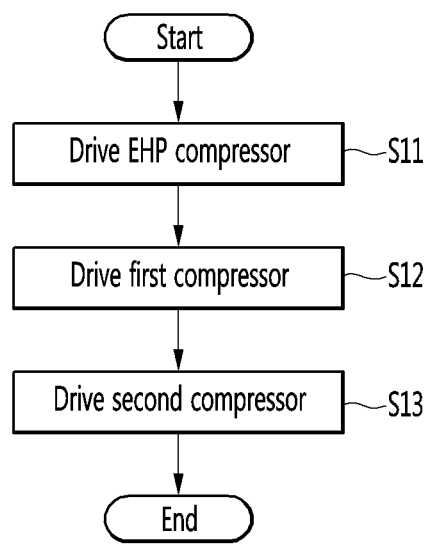
FIG. 4 is a flowchart of a method for controlling the air conditioner of FIG. 1.

FIG. 4 is a flowchart of a method for controlling the air conditioner of FIG. 1. Referring to FIG. 4, a method for controlling the air conditioner according to an embodiment may control the air conditioner 1 to enable an entire load of the air conditioner 1 to be changed linearly. This may be referred to as a "control method in a general mode".

The control method in the general mode may include an operation S11 of driving the EHP compressor 210, an operation S12 of driving the first compressor 311 of the GHP compressor 310, and an operation S13 of driving the second compressor 312 of the GHP compressor 310. The operation S11 of driving the EHP compressor 210 may include an operation in which the inverter may gradually increase a frequency of a current applied to the EHP compressor 210 and may drive the EHP compressor 210. As the frequency of the current applied to the EHP compressor 210 is increased, the driving load of the EHP compressor 210 may approach a maximum value.

The operation S12 of driving the first compressor 311 of the GHP compressor 310 may include an operation in which the first compressor 311 may be driven in a state in which the first bypass pipe 311*a* provided at the first compressor 311 is opened. That is, when the first capacity valve 311*b* is opened, driving of the first compressor 311 may start. That is, the first compressor 311 may be operated to have the partial load.

More specifically, in the operation S12 of driving the first compressor 311, when the frequency of the current applied to the EHP compressor 210 reaches a predetermined first level, the driving of the first compressor 311 may be started when the first capacity valve 311*b* is opened to open the first bypass pipe 311*a*. The predetermined first level may be a frequency value of the current applied from the inverter to the EHP compressor 210 when the driving load of the EHP compressor 210 is about 10% to 30% of a maximum value. The operation S12 of driving the first compressor 311 may include an operation in which the first compressor 311 may be operated with the partial load until the driving load of the EHP compressor 210 reaches 50% of the maximum value.

The operation S13 of driving the second compressor 312 of the GHP compressor 310 may include an operation in which, when the frequency of the current from the inverter to the EHP compressor 210 reaches a predetermined second level, the second compressor 312 may be driven in a state in which the first bypass pipe 311*a* is closed, and the second bypass pipe 312a provided at the second compressor 312 of the GHP compressor 310 is opened. More specifically, in the operation S13 of driving the second compressor 312, when the frequency of the current from the inverter to the EHP compressor 210 reaches the predetermined second level, the driving of the second compressor 312 may be started again when the first capacity valve 311b is closed to close the first bypass pipe 311a, and the second capacity valve 312b is opened to open the second bypass pipe 312a. That is, the first compressor 311 may be driven at the full load, and the second compressor 312 may be driven at the partial load. The predetermined second level may be a frequency value of the current applied from the inverter to the EHP compressor 210 when the driving load of the EHP compressor 210 may be about 30% to 50% of the maximum value.

In the operation S13 of driving the second compressor 312, until the driving load of the EHP compressor 210 reaches about 70% of the maximum value, the first compressor 311, for which the first bypass pipe 311a is closed, may be operated at the full load, and the second compressor 312, for which the second bypass pipe 312a is opened, may be driven at the partial load. Then, when the second capacity valve 312b closes the second bypass pipe 312a, the driving load of the EHP compressor 210 may be operated with the maximum value, and each of the first compressor 311 and the second compressor 312 may also be operated at the full load.

When the air conditioner 1 is driven using the control method in the general mode, the entire load of the air conditioner 1 may be changed linearly, and thus, breakdown in the EHP compressor 210 and the GHP compressor 310 of the air conditioner 1 may be minimized.

Figure 5:
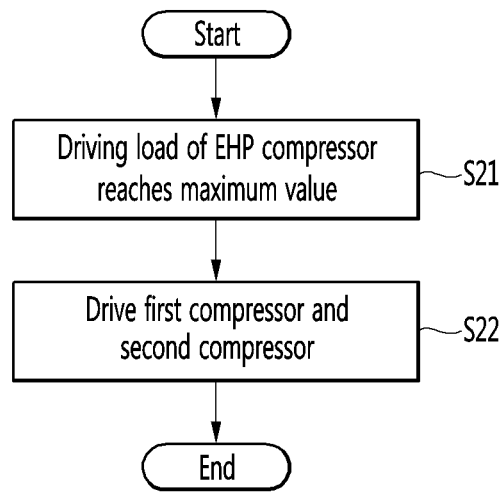
FIG. 5 is a flowchart of a method for controlling the air conditioner according to another embodiment.

FIG. 5 is a flowchart of a method for controlling the air conditioner according to another embodiment. Referring to FIG. 5, a method for controlling the air conditioner according to another embodiment may enable the air conditioner 1 to be operated with high efficiency. This may be referred to as a "control method in a high efficiency mode". The control method in the high efficiency mode may include an operation S21, in which the driving load of the EHP compressor 210 may reach the maximum value, and an operation S22, in which the first compressor 311 and the second compressor 312 may be driven.

The operation S21, in which the driving load of the EHP compressor 210 may reach the maximum value, may include an operation in which the inverter may gradually increase the frequency of the current applied to the EHP compressor 210, and thus, the driving load of the EHP compressor 210 may reach the maximum value. The operation S22, in which the first compressor 311 and the second compressor 312 may be driven, may include an operation in which, when the driving load of the EHP compressor 210 reaches the maximum value, the driving of the first compressor 311 may be started in a state in which the first bypass pipe 311a is closed, and the driving of the second compressor 312 may be started in a state in which the second bypass pipe 312a is closed. Therefore, each of the first compressor 311 and the second compressor 312 may be operated with the full load. That is, as the first compressor 311 and the second compressor 312 are driven when the first capacity valve 311b is closed to close the first bypass pipe 311a and the second capacity valve 312b is closed to close the second bypass pipe 312a, each of the first compressor 311 and the second compressor 312 may be operated with the full load.

In the control method in the high efficiency mode, as the GHP compressor 310 is driven after the EHP compressor 210 reaches the full load, driving efficiency of the air conditioner 1 may be improved.

Figure 6:
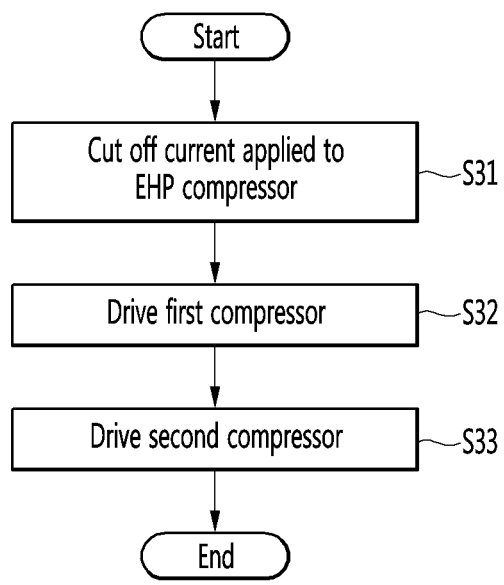
FIG. 6 is a flowchart of a method for controlling the air conditioner according to still another embodiment.

FIG. 6 is a flowchart of a method for controlling the air conditioner according to still another embodiment. Referring to FIG. 6, a method for controlling the air conditioner according to still another embodiment may control the air conditioner 1 when a power supply and demand state is not good or when electric charge is expensive. This may be referred to as a "control method in a power peak mode". The control method in the power peak mode may include an operation S31 of cutting off the current applied to the EHP compressor 210, an operation S32 of driving the first compressor 311, and an operation S33 of driving the second compressor 312.

The operation S31 of cutting off the current applied to the EHP compressor 210 may include an operation in which the current applied to the EHP compressor 210 may be cut off. That is, the EHP compressor 210 may be in a stopped state.

In the operation S32 of driving the first compressor 311, the first compressor 311 may be driven in a state in which the path of the first bypass pipe 311a is opened. That is, the first compressor 311 may be driven when the first capacity valve 311b is opened to open the first bypass pipe 311a. Therefore, the first compressor 311 may be operated with the partial load.

The operation S33 of driving the second compressor 312 may include an operation in which, when the driving load of the first compressor 311 reaches the maximum value, the second compressor 312 may be driven in a state in which the first bypass pipe 311a is closed and the second bypass pipe 312a is opened. That is, when the driving load of the first compressor 311 reaches the maximum value, each of the first compressor 311 and the second compressor 312 may be driven when the first capacity valve 311b is closed to close the first bypass pipe 311a and the second capacity valve 312b is closed to close the second bypass pipe 312a.

The first compressor 311, for which the first bypass pipe 311a is closed, may be driven at the full load, and the second compressor 312, for which the second bypass pipe 312a is opened, may be driven at the partial load. Then, when the driving load of the second compressor 312 reaches the maximum value, the second bypass pipe 312a may be closed by the second capacity valve 312b. Accordingly, the second compressor 312, for which the path of the second bypass pipe 312a is closed, may be operated with the full load.

In the control method in the power peak mode, as the EHP compressor 210 is not driven and only the GHP compressor 310 is driven, the air conditioner 1 may be operated without any consumption of electric power. Accordingly, the consumption of electric power may be reduced.

In the air conditioner and the method for controlling the air conditioner according to embodiments disclosed herein, start efficiency may be improved, energy may be reduced, and driving may be smoothly performed even when the electric power supply and demand state may not be stable. In particular, when the air conditioner is controlled in the general mode, the entire load of the air conditioner may be linearly changed, and thus, breakdown of the EHP compressor and the GHP compressor may be minimized. When the air conditioner is controlled in the high efficiency mode, the GHP compressor may be driven after the EHP compressor reaches the full load, and thus, driving efficiency of the air conditioner may be improved. When the air conditioner is controlled in the power peak mode, the EHP compressor may not be driven, and only the GHP compressor may be driven, and thus, the air conditioner may be operated without the consumption of electric power. Therefore, the consumption of electric power may be reduced.

An air conditioner and a method for controlling an air conditioner according to embodiments disclosed herein may improve start efficiency, reduce energy consumption, and also be smoothly driven, even when electric power supply and a demand state are not stable.

Embodiments disclosed herein provide an air conditioner that may include at least one indoor unit or device; an EHP outdoor unit or device connected to the at least one indoor unit, and having an EHP compressor driven by an applied current; and a GHP outdoor unit or device connected to the at least one indoor unit, and having an engine which may be driven by a combustion of gas and a GHP compressor which may be driven by receiving a driving force from the engine. The EHP compressor may include an inverter that controls a frequency of the current applied to the EHP compressor, and the GHP compressor may include a first compressor that receives a driving force from the engine and compresses a refrigerant, and a second compressor, which may be connected to the first compressor in parallel, that receives the driving force from the engine and compresses the refrigerant.

The air conditioner may further include a bypass pipe which may be installed or provided at a side of the first compressor or the second compressor, and may enable a high pressure side of the GHP compressor to be in communication with a low pressure side thereof. The bypass pipe may include a first bypass pipe that connects a high pressure side of the first compressor to a low pressure side thereof so that the refrigerant may flow therethrough, and a second bypass pipe that connects a high pressure side of the second compressor to a low pressure side thereof so that the refrigerant may flow therethrough.

The air conditioner may further include a capacity valve, which may be installed or provided at the first bypass pipe or the second bypass pipe and may control a flow of the refrigerant. The capacity valve may include a first capacity valve, which may be provided at the first bypass pipe to selectively open a path of the first bypass pipe, and a second capacity valve, which may be provided at the second bypass pipe to selectively open a path of the second bypass pipe.

The inverter may drive the EHP compressor to gradually increase the frequency of the current applied to the EHP compressor, and when the frequency of the current applied from the inverter to the EHP compressor reaches a predetermined first level, driving of the first compressor may be started in a state in which the first capacity valve opens the path of the first bypass pipe. The predetermined first level may be a frequency value of the current applied from the inverter to the EHP compressor when a driving load of the EHP compressor is about 10% to 30% of a maximum value.

While the first compressor is driven in a state in which the first capacity valve opens the path of the first bypass pipe, the first capacity valve may close the path of the first bypass pipe, and driving of the second compressor may be started in a state in which the second capacity valve opens the path of the second bypass pipe when the frequency of the current applied from the inverter to the EHP compressor reaches a predetermined second level. The predetermined second level may be a frequency value of the current applied from the inverter to the EHP compressor when a driving load of the EHP compressor is about 30% to 50% of a maximum value.

When the inverter gradually increases the frequency of the current applied to the EHP compressor and a driving load of the EHP compressor reaches a maximum value, driving of the first compressor may be started in a state in which the first capacity valve closes the path of the first bypass pipe, and driving of the second compressor may be started in a state in which the second capacity valve closes the path of the second bypass pipe. The inverter may cut off the current applied to the EHP compressor, and the first compressor may be driven in a state in which the first capacity valve opens the path of the first bypass pipe, and when a driving load of the first compress reaches a partial load, the first compressor may be driven in a state in which the first capacity valve closes the path of the first bypass pipe, and driving of the second compressor may be started in a state in which the second capacity valve opens the path of the second bypass pipe. While the second compressor is driven in the state in which the second capacity valve opens the path of the second bypass pipe, the second capacity valve of the second compressor may close the path of the second bypass pipe when the driving load of the second compressor reaches the partial load.

Embodiments disclosed herein further provide a method for controlling an air conditioner in which each of an EHP outdoor unit or device having an EHP compressor using an electric motor as a driving source and a GHP outdoor unit or device having a GHP compressor using an engine as a driving source are connected to an indoor unit or device, the method including an operation in which an inverter of the EHP outdoor unit gradually increases a frequency of a current applied to the EHP compressor, and drives the EHP compressor; an operation in which a first compressor of the GHP compressor is driven in a state in which a path of a first bypass pipe provided at the first compressor is opened; and an operation in which, when the frequency of the current applied from the inverter to the EHP compressor reaches a predetermined second level, a second compressor of the GHP is driven in a state in which the path of the first bypass pipe is closed and a path of a second bypass pipe provided at the second compressor is opened. The first bypass pipe may connect a high pressure side of the first compressor to a low pressure side thereof, so that a refrigerant may selectively flow therethrough, and the second bypass pipe may connect a high pressure side of the second compressor to a low pressure side thereof, so that the refrigerant may selectively flow therethrough.

When the frequency of the current applied from the inverter to the EHP compressor reaches a predetermined first level, driving the first compressor may be started in a state in which the path of the first bypass pipe is opened. The predetermined first level may be a frequency value of the current applied from the inverter to the EHP compressor when a driving load of the EHP compressor is about 10% to 30% of a maximum value. The predetermined second level may be a frequency value of the current applied from the inverter to the EHP compressor when the driving load of the EHP compressor is about 30% to 50% of a maximum value.

Embodiments disclosed herein also provide a method for controlling an air conditioner in which each of an EHP outdoor unit or device having an EHP compressor using an electric motor as a driving source and a GHP outdoor unit or device having a GHP compressor using an engine as a driving source are connected to an indoor unit or device, the method including an operation in which an inverter of the EHP outdoor unit gradually increases a frequency of a current applied to the EHP compressor, and a driving load of the EHP compressor reaches a maximum value; and an operation in which a first compressor of the GHP compressor is driven in a state in which a path of a first bypass pipe is closed, and a second compressor of the GHP compressor is driven in a state in which a path of a second bypass pipe is closed. The first bypass pipe may connect a high pressure side of the first compressor to a low pressure side thereof so that a refrigerant may selectively flow therethrough, and the second bypass pipe may connect a high pressure side of the second compressor to a low pressure side thereof so that the refrigerant may selectively flow therethrough.

Embodiments disclosed herein also provide a method for controlling an air conditioner in which each of an EHP outdoor unit or device having an EHP compressor using an electric motor as a driving source and a GHP outdoor unit or device having a GHP compressor using an engine as a driving source are connected to an indoor unit or device, the method including an operation in which an inverter of the EHP outdoor unit cuts off a current applied to the EHP compressor; an operation in which a first compressor of the GHP compressor is driven in a state in which a path of a first bypass pipe provided at the first compressor is opened; and an operation in which, when a driving load of the first compressor reaches a partial load, a second compressor of the GHP compressor is driven in a state in which the path of the first bypass pipe is closed and a path of a second bypass pipe provided at the second compressor is opened. The first bypass pipe may connect a high pressure side of the first compressor to a low pressure side thereof, so that a refrigerant may selectively flow therethrough, and the second bypass pipe may connect a high pressure side of the second compressor to a low pressure side thereof, so that the refrigerant may selectively flow therethrough.

The method may further include an operation in which, when a driving load of the second compressor reaches the partial load, the path of the second bypass pipe may be closed.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air conditioner, comprising:
   at least one indoor device;
   an electric heat pump (EHP) outdoor device connected to the at least one indoor device and having an EHP compressor driven using an applied current; and
   a gas heat pump (GHP) outdoor device connected to the at least one indoor device having an engine driven using a combustion of gas and a GHP compressor driven by receiving a driving force from the engine, wherein the EHP compressor includes an inverter that controls a frequency of the current applied to the EHP compressor, and wherein the GHP compressor includes:
      a first compressor that receives a driving force from the engine to compress a refrigerant; and
      a second compressor that is connected to the first compressor in parallel and receives the driving force from the engine to compress the refrigerant.

2. The air conditioner according to claim 1, further including a bypass pipe provided at a side of at least one of the first compressor or the second compressor that enables a high pressure side of the GHP compressor to communicate with a low pressure side thereof.

3. The air conditioner according to claim 2, wherein the bypass pipe includes:
   a first bypass pipe that connects a high pressure side of the first compressor to a low pressure side thereof; and
   a second bypass pipe that connects a high pressure side of the second compressor to a low pressure side thereof.

4. The air conditioner according to claim 3, further including a capacity valve provided at at least one of the first bypass pipe or the second bypass pipe that controls a flow of the refrigerant.

5. The air conditioner according to claim 4, wherein the capacity valve includes:
   a first capacity valve provided at the first bypass pipe to selectively open the first bypass pipe; and
   a second capacity valve provided at the second bypass pipe to selectively open the second bypass pipe.

6. The air conditioner according to claim 5, wherein the inverter drives the EHP compressor to gradually increase the frequency of the current applied to the EHP compressor.

7. The air conditioner according to claim 6, wherein, when the frequency of the current applied to the EHP compressor reaches a predetermined first level, the first compressor is started and driven in a state in which the first capacity valve is opened to open the first bypass pipe.

8. The air conditioner according to claim 7, wherein the predetermined first level is a frequency value of the current applied to the EHP compressor when a driving load of the EHP compressor is about 10% to 30% of a maximum value.

9. The air conditioner according to claim 7, wherein, when the frequency of the current applied to the EHP compressor reaches a predetermined second level while the first compressor is driven in a state in which the first capacity valve is opened to open the first bypass pipe, the first capacity valve is closed to close the first bypass pipe and the second compressor is started and driven in a state in which the second capacity valve is opened to open the second bypass pipe.

10. The air conditioner according to claim 9, wherein the predetermined second level is a frequency value of the current applied to the EHP compressor when a driving load of the EHP compressor is about 30% to 50% of a maximum value.

11. The air conditioner according to claim 5, wherein, when the inverter gradually increases the frequency of the current applied to the EHP compressor and a driving load of the EHP compressor reaches a maximum value, the first compressor is started and driven in a state in which the first capacity valve is closed to close the first bypass pipe, and the second compressor is started and driven in a state in which the second capacity valve is closed to close the second bypass pipe.

12. The air conditioner according to claim 5, wherein the inverter cuts off the current applied to the EHP compressor and the first compressor is driven in a state in which the first capacity valve is opened to open the first bypass pipe, and when a driving load of the first compressor reaches a partial load, the first compressor is started and driven in a state in which the first capacity valve is closed to close the first bypass pipe and the second compressor is started and driven in a state in which the second capacity valve is opened to open the second bypass pipe.

13. The air conditioner according to claim 12, wherein, while the second compressor is driven in the state in which the second capacity valve is opened to open the second bypass pipe, when the driving load of the second compressor reaches the partial load, the second capacity valve is closed to close the second bypass pipe.

14. A method for controlling an air conditioner in which each of an electric heat pump (EHP) outdoor device having an EHP compressor using an electric motor and a gas heat pump (GHP) outdoor device having a GHP compressor using an engine are connected to at least one indoor device, the method comprising:
    driving the EHP compressor by increasing a frequency of a current applied to the EHP compressor using an inverter of the EHP outdoor device;
    driving a first compressor of the GHP compressor when a first bypass pipe provided at the first compressor is opened; and
    driving a second compressor of the GHP compressor when the first bypass pipe is closed and a second bypass pipe provided at the second compressor is opened when the frequency of the current applied from the inverter to the EHP compressor reaches a predetermined first level, wherein the first bypass pipe connects a high pressure side of the first compressor to a low pressure side thereof, and the second bypass pipe connects a high pressure side of the second compressor to a low pressure side thereof.

15. The method according to claim 14, wherein, when the frequency of the current applied to the EHP compressor reaches a predetermined second level, driving of the first compressor is started in a state in which the first bypass pipe is opened.

16. The method according to claim 14, wherein the predetermined first level is a frequency value of the current applied to the EHP compressor when a driving load of the EHP compressor is about 10% to 30% of a maximum value.

17. The method according to claim 16, wherein the predetermined first level is a frequency value of the current applied from the inverter to the EHP compressor when the driving load of the EHP compressor is about 30% to 50% of the maximum value.

18. A method for controlling an air conditioner in which each of an electric heat pump (EHP) outdoor device having an EHP compressor using an electric motor and a gas heat pump (GHP) outdoor device having a GHP compressor using an engine are connected to at least one indoor device, the method comprising:
    increasing a frequency of a current applied to the EHP compressor by an inverter of the EHP outdoor device such that a driving load of the EHP compressor reaches a maximum value; and
    driving a first compressor of the GHP compressor when a first bypass pipe is closed and driving a second compressor of the GHP compressor when a second bypass pipe is closed, wherein the first bypass pipe connects a high pressure side of the first compressor to a low pressure side thereof, and the second bypass pipe connects a high pressure side of the second compressor to a low pressure side thereof.

19. A method for controlling an air conditioner in which each of an electric heat pump (EHP) outdoor device having an EHP compressor using an electric motor and a gas heat pump (GHP) outdoor device having a GHP compressor using an engine are connected to at least one indoor device, the method comprising:
    cutting off a current applied to the EHP compressor by an inverter of the EHP outdoor device;
    driving a first compressor of the GHP compressor when a first bypass pipe provided at the first compressor is opened; and
    driving a second compressor of the GHP compressor when the first bypass pipe is closed and a second bypass pipe provided at the second compressor is opened when a driving load of the first compressor reaches a partial load, wherein the first bypass pipe connects a high pressure side of the first compressor to a low pressure side thereof, and the second bypass pipe connects a high pressure side of the second compressor to a low pressure side thereof.

20. The method according to claim 19, further including closing the second bypass pipe when a driving load of the second compressor reaches the partial load.

21. A method for controlling an air conditioner in which each of an electric heat pump (EHP) outdoor device having an EHP compressor using an electric motor and a gas heat pump (GHP) outdoor device having a GHP compressor using an engine are connected to at least one indoor device, the method comprising:
    selectively driving the EHP compressor using an inverter of the EHP outdoor device to control a frequency of a current applied to the EHP compressor;
    selectively driving a first compressor of the GHP compressor at a partial load or a maximum load using a first bypass pipe provided at the first compressor, which is selectively opened or closed based on the frequency of the current applied to the EHP compressor; and
    selectively driving a second compressor of the GHP compressor at a partial load or a maximum load using a second bypass pipe provided at the second compressor, which is selectively opened or closed based on the frequency of the current applied to the EHP compressor, wherein the first bypass pipe connects a high pressure side of the first compressor to a low pressure side thereof, and the second bypass pipe connects a high pressure side of the second compressor to a low pressure side thereof.

* * * * *